Jan. 6, 1931. H. MORIER ET AL 1,788,317
SAFETY TRANSMISSION BRAKE
Filed Sept. 9, 1929    2 Sheets-Sheet 1

Henry Morier
Henry Comtois
INVENTORS

BY *Victor J. Evans*
ATTORNEY

WITNESS: *J. J. Novak*

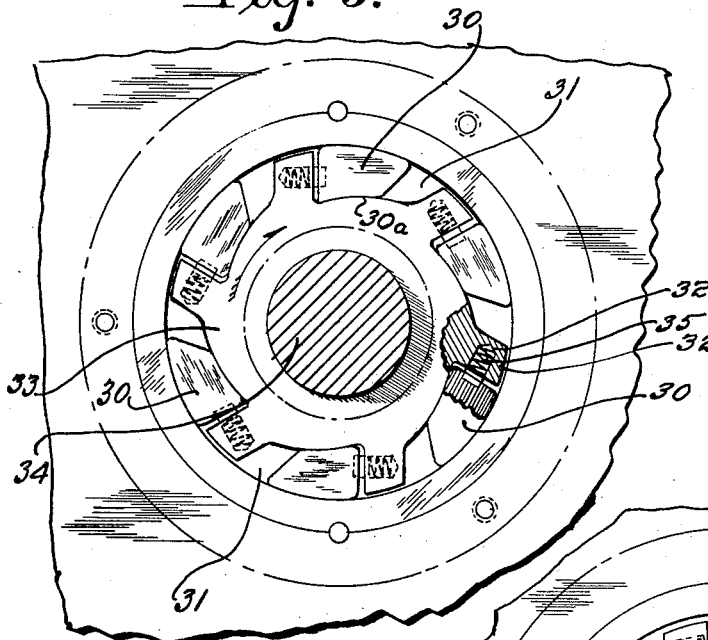
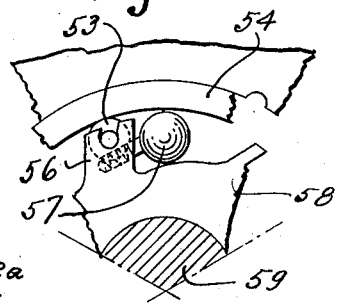
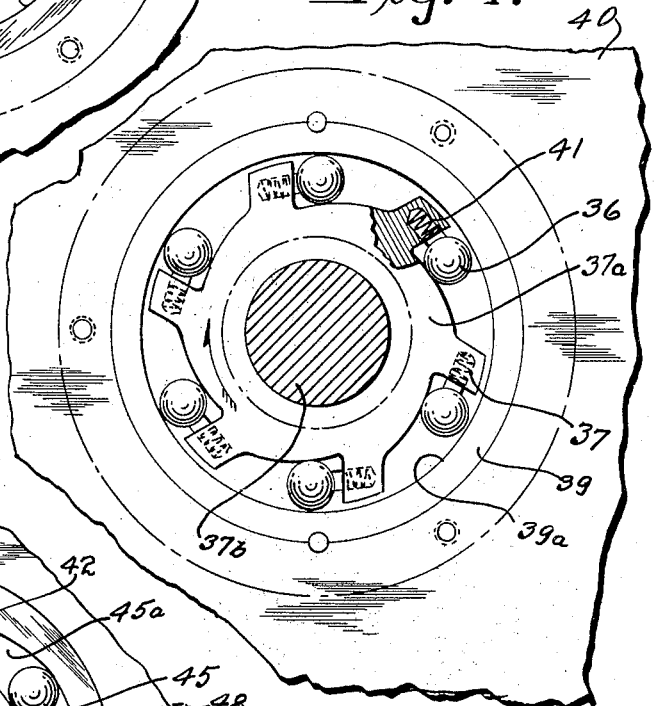
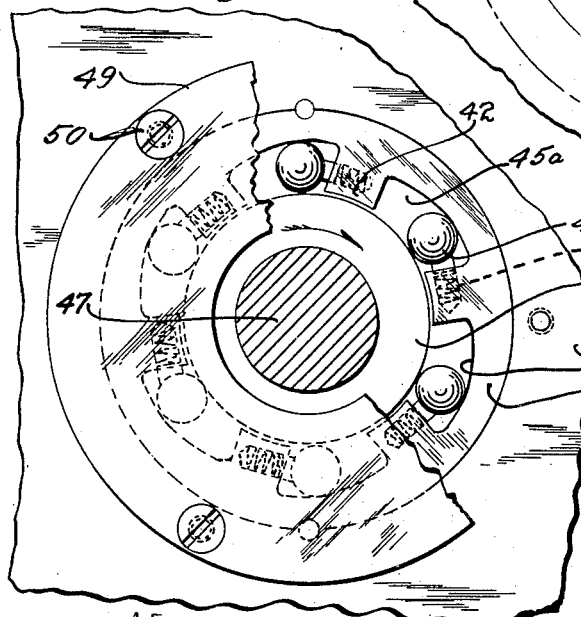

Patented Jan. 6, 1931

1,788,317

UNITED STATES PATENT OFFICE

HENRY MORIER, OF WATERBURY, CONNECTICUT, AND HENRY COMTOIS, OF NEW ROCHELLE, NEW YORK

SAFETY TRANSMISSION BRAKE

Application filed September 9, 1929. Serial No. 391,434.

This invention relates to improvements in transmissions for automobiles and all moving or stationary machinery, involving a clutch shaft and a transmission shaft driven in one direction only, and its leading object is to provide an automatic device which will prevent the clutch shaft from turning in a reverse direction, either by the action of an engine backfire, or by the rolling of an automobile backwards downhill.

Another object of the invention is to provide a combined roller bearing for the clutch shaft which will function as a safety brake for an automobile, so that backward rolling of the vehicle, or reverse driving of other machinery, will be automatically prevented when the driving clutch is engaged.

Other objects and advantages of the invention will be hereinafter specifically pointed out, or will become apparent, as the specification proceeds.

With the above indicated objects in view, the invention resides in certain novel constructions and combinations and arrangement of parts, clearly described in the following specification and fully illustrated in the accompanying drawings, which latter show an embodiment of the invention as at present preferred.

In the drawings:—

Fig. 3 is a transverse sectional view of a modified form of the device.

Fig. 4 is a transverse sectional view of another modified form.

Fig. 5 is a transverse sectional view showing a modification of Fig. 4.

Fig. 6 is a sectional fragmentary view showing roller bearings interposed between the parts in combination with the aforesaid modifications.

Figure 1:
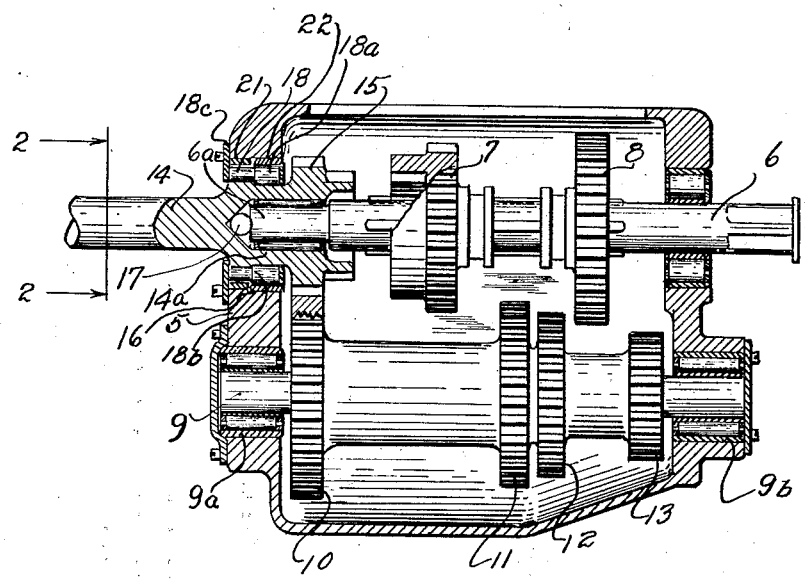
Fig. 1 is a view through an automobile transmission, partly in elevation and partly in section, showing the improved device.

In the operation of driving an automobile, it frequently occurs that a driver must hold his car on a hill, against reverse downhill movement, by holding his foot upon the brake pedal, and if the period of waiting is prolonged, the effort required is very taxing. Moreover, it is necessary that brake pressure be manually applied without any fractional delay, so that the car will not gain downhill momentum. Should the brakes fail to function properly, or oil reach the braking surfaces, slippage of the brake drums and wheels follow, and serious accidents frequently result from such conditions.

Transmission brakes have been used in the past, but these have operated by manual action, similar to that required for the operation of the wheel brakes.

The present invention is directed to a transmission brake which operates automatically, whenever the clutch shaft starts to turn in a reverse direction, and since the clutch shaft is always driven constantly in one direction, this automatic transmission brake will continue to function, without modifying the power transmitting functions of the regular transmission.

While the invention is particularly designed to be used for automobiles, it is adaptable for use in connection with any stationary machinery or road, or aerial, motor driven vehicle or machinery.

Referring to the accompanying drawings, 5 designates the housing of a transmission, in which the transmission shaft 6 is journaled for rotation. On this shaft the usual sliding gears 7 and 8 are mounted. Below the transmission shaft the secondary or transfer shaft 9 is journaled in the bearings 9a and 9b of said housing.

On the secondary or transfer shaft the gears 10, 11, 12 and 13 are fixed.

The rear end of a clutch shaft 14 extends into the housing 5 and carries a gear 15 which is in constant driving engagement with the gear 10 of the transfer shaft. The forward end of the transmission shaft is reduced at 6a and has a bearing in the bore 14a of the clutch shaft, through the center of the gear 15 thereof, and works in the roller bearing 16 and against the end thrust ball bearing 17. This construction is old and well known.

The forward end of the clutch shaft 14 works in a combined roller bearing and automatic braking device, consisting of a series of bearing rollers 18, the forward ends of which engage the raceways 19 on the external surface of the clutch shaft, and raceways 20 in the cylindrical member or bearing ring 21, which is mounted in the housing 5.

In the practice of this invention, certain of the bearing rollers 18a are elongated rearwardly and work in the extension 22 of the bearing ring 21, and against the collar 23 mounted on the clutch shaft. The collar 23 is formed with a series of radial lugs 24 and cam surfaces 25 between these lugs, against which the bearing rollers 18a work. These cam surfaces extend on curved lines which increase in radius from their innermost ends 25a to their outermost ends 25b. The distance between the lugs 24 is approximately equal to slightly more than twice the diameter of each bearing roller.

Figure 2:
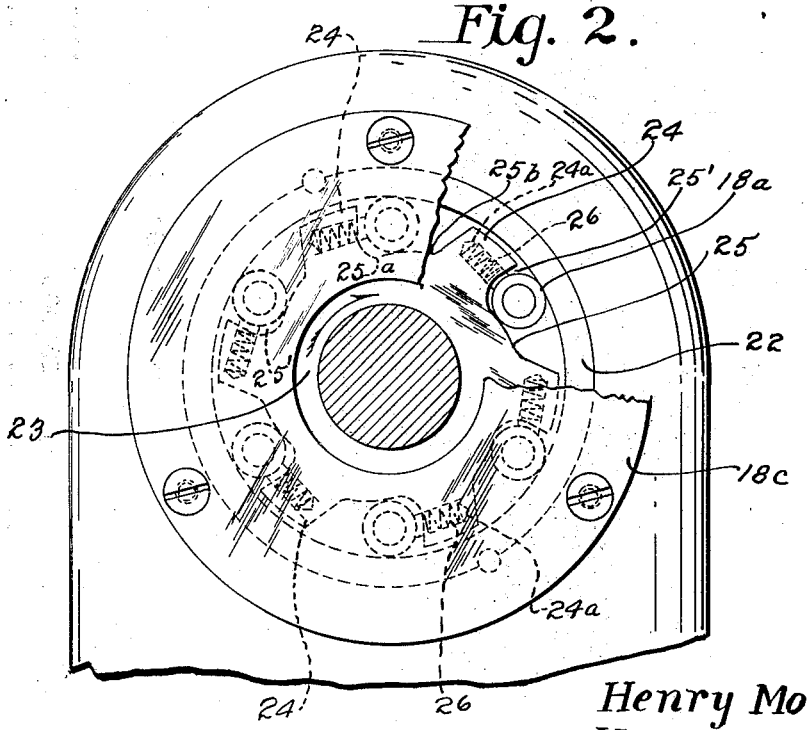
Fig. 2 is a cross sectional view taken on line 2 of Fig. 1, looking in the direction of the arrows.

The collar or ring 23 which carries the internal lugs 24 rotates in the direction indicated by the arrow in Fig. 2, thus keeping the rollers 18a always engaged with the innermost end portions of the cam surfaces, so that the rollers will freely turn, without restrain or pressure of a wedging character in the spaces between the cam surfaces and the inner peripheral surface of the extension ring 22.

Only a portion of the bearing rollers 18a are extended into the cam pockets 25', as the lugs 24 prevent all of the bearing rollers from entering said cam pockets. But all of the bearing rollers are free to turn around the clutch shaft, when the clutch shaft is turning in normal power transmitting direction. Coil springs 26 work against the rollers 18a and are retained in place in the spring recesses 24a of the lugs 24.

When pressure is applied on the clutch shaft to turn it in a reverse direction the bearing rollers will ride along the cam surfaces 25, and be jammed against the ring extension 22, thus preventing reverse turning of the clutch shaft without loss of time, as the action would take place instantaneously. The rollers 18a each have a shoulder 18b and all are retained in place by the plate 18c.

Instead of extending the bearing rollers 18 a separate enclosed group of rollers may be employed within the ring 22, and the action would be similar.

In Fig. 3, I show an arrangement in which wedge blocks 30 are employed, instead of the extended bearing rollers. These wedge blocks work in the cam pockets 31 formed between the radial integral lugs 32 of the collar 33, which is fixed on the clutch shaft 34, as in the manner previously described. The wedge blocks are engaged by the coil springs 35, which are retained in place by the pockets or recesses 32a of the lugs 32.

When the clutch shaft 34 starts to turn in a reverse direction, the wedge blocks 30 will ride along the cam surfaces 30a formed between the lugs 32 and be locked against further turning.

In Fig. 4 we show an arrangement wherein balls 36 are used between the lugs 37 and work on the cam surfaces 38 between said lugs, against the inner peripheral surface 39a of the ring 39, which is detachably fitted in the housing 40. The lugs 37 are formed on the collar 37a fixed to the clutch shaft 37b. Coil springs 41 work against the balls to propel them along the cam surfaces when the clutch shaft starts to turn in a reverse direction.

In Fig. 5, we show another modified form of the invention, wherein the lugs 42 are formed in the ring 43, which is secured in the housing 44. Balls or rollers 45 are arranged in the cam pockets 45 between said lugs, and bear against the ring or collar 46 on the clutch shaft 47 and against the cam surfaces 43a of the ring 43. Springs 48 engage the balls or rollers 45 and are retained in place by the recesses or pockets 45a of the lugs 42.

In the construction shown in Figs. 3, 4 and 5, a retaining plate 49 holds the assembled parts in the housing, by means of the screws 50, as indicated in Fig. 5.

Each of the constructions in the arrangements disclosed and embracing the combination of the clutch and transmission shafts, not only provides means for locking the clutch shaft against turning, and consequently locking the transmission shaft against turning in reverse directions, when the clutch is engaged, due to downhill rolling, but also provides means for preventing the power shaft of any power plant, coupled by its clutch to the clutch and transmission shafts, from turning in a reverse direction, due to the action of a backfire, or engine explosion when the crank shaft has not yet passed its dead center.

No operating or mechanical change is required in the transmission, engine plant, or general equipment or installation, other than that indicated.

The device in its combined relation may be applied to any stationary or moving machinery employing a clutch controlled drive, or may be used in any vehicle, operated on land, water or in the air, for preventing reverse turning under a backfire, or under any other conditions arising in the normal operation or use of the equipment.

Fig. 6 illustrates a combination of the aforesaid modifications with a roller bearing 53 between the outer ring 54 and the lug 56; the ball 57 acting as described in Fig. 4. The lug 56 in this modification is recessed to receive the roller bearings 53 and several balls 57 or a roller could be used to engage the collar 58 and the outer ring 54 for a braking action when the shaft 59 is reversed.

The hereinbefore described construction admits of considerable modifications without departing from the invention; therefore, we do not wish to be limited to the precise arrangements shown and described, which are, as aforesaid, by way of illustration merely. In other words, the scope of protection contemplated is to be taken solely from the appended claims, interpreted as broadly as is consistent with the prior art.

We claim as new:—

1. The combination with a clutch shaft and its bearing, of roller bearings disposed between the shaft and its bearing, a ring mounted on the shaft and provided with a series of radially spaced cam surfaces increasing in radius, certain of the bearing rollers being extended and being engageable with the cam surfaces, and a ring in said bearing against which the bearing rollers work and the elongated portions of certain of said rollers work, whereby the clutch shaft will be locked against turning in one direction in said bearing when a turning effort is applied thereto in said direction.

2. The combination with a clutch shaft and its bearing, of roller bearing disposed between the shaft and its bearing, a ring mounted on the shaft and provided with a series of radially spaced integral lugs and a series of cam surfaces therebetween, said cam surfaces increasing in radius, certain of the bearing rollers being extended and being engageable with the cam surfaces, and a ring in said bearing against which the bearing rollers work and the elongated portions of certain of said rollers work, whereby the clutch shaft will be locked against turning in one direction in said bearing when a turning effort is applied thereto in said direction.

3. The combination with a clutch shaft and its bearing, of bearing rollers disposed between the shaft and its bearing, certain of said rollers being extended endwise of the remaining rollers, a ring enclosing the extended rollers, a ring enclosing all of the rollers, a member carried by the shaft and provided with a series of integral lugs and cam surfaces located between the lugs, said cam surfaces increasing in radius from one lug to the next lug, and springs bearing against the lugs and the extended rollers.

4. The combination with a clutch shaft and its bearing, of bearing rollers disposed between the shaft and its bearing, certain of said rollers being extended endwise of the remaining rollers, a ring enclosing the extended rollers, a ring enclosing all of the rollers, a member carried by the shaft and provided with a series of integral lugs and cam surfaces located between the lugs, said cam surfaces increasing in radius from one lug to the next lug, and springs bearing against the lugs and the extended rollers, said lugs having means for retaining the springs in position against the rollers.

5. The combination with a clutch shaft and its bearing, of bearing rollers disposed between the shaft and its bearing, certain of said rollers being extended endwise of the remaining rollers, a ring enclosing the extended rollers, a ring enclosing all of the rollers, a member carried by the shaft and provided with a series of integral lugs and cam surfaces located between the lugs, said cam surfaces increasing in radius from one lug to the next lug, and springs bearing against the lugs and the extended rollers, said lugs having recesses holding the springs in place.

In testimony whereof we hereby affix our signatures.

HENRY MORIER.
HENRY COMTOIS.